United States Patent [19]
Bossen et al.

[11] 3,757,122
[45] Sept. 4, 1973

[54] BASIS WEIGHT GAUGING APPARATUS, SYSTEM AND METHOD

[76] Inventors: David A. Bossen, 11510 Summit Wood Rd., Los Altos Hills; Eugene R. Anderson, 20335 Argonaut Dr.; Erik B. Dahlin, 13696 Camion Rico, both of Saratoga, all of Calif.

[22] Filed: Oct. 30, 1972

[21] Appl. No.: 302,096

Related U.S. Application Data

[63] Continuation of Ser. No. 115,100, Feb. 12, 1971, abandoned, which is a continuation-in-part of Ser. No. 791,972, Jan. 17, 1969, abandoned.

[52] U.S. Cl ........................................... 250/358
[51] Int. Cl. ............................................. G01t 1/16
[58] Field of Search ..................... 290/83.3 D, 83 C, 290/83.3 R, 43.5 D, 83.3 H, 83.6 R, 52

[56] References Cited
UNITED STATES PATENTS
3,348,046   10/1967   Lloyd .............................. 250/83.3 D

*Primary Examiner*—James W. Lawrence
*Assistant Examiner*—Davis L. Willis
*Attorney*—Jerry G. Wright

[57] ABSTRACT

A basis weight gauging apparatus and system for ascertaining the basis weight of sheet material having a radiation source providing radiation in the form of a succession of events and a radiation detector located to receive the radiation after it has come into contact with the material. Counting means scale the events which are received by the radiation detector for a predetermined period of time and these counts are utilized to obtain the weight per unit area measurement of the sheet material. When the basis weight measurements are being made continuously, a standardization means is provided to insure that the basis weight measurements are accurate.

1 Claim, 8 Drawing Figures

PATENTED SEP 4 1973 3,757,122

INVENTORS
DAVID A. BOSSEN
EUGENE R. ANDERSON
ERIC B. DAHLIN
BY Flehr, Hohbach, Test,
Albritton & Herbert
Attorneys

BASIS WEIGHT GAUGING APPARATUS, SYSTEM AND METHOD

CROSS REFERENCE TO RELATED APPLICATIONS

This application is a continuation in part of abandoned application Ser. No. 115,100, filed Feb. 12, 1971, entitled "Basis Weight Gauging Apparatus, System and Method Using A Digital Count" in the names of David A. Bossen, Eugene R. Anderson, and Erik B. Dahlin, which is a continuation in part of abandoned application Ser. No. 791,972, filed Jan. 17, 1969, entitled "Basis Weight Gauging Apparatus, System and Method Using a Digital Count" in the names of David A. Bossen, Eugene R. Anderson and Erik B. Dahlin.

BACKGROUND OF THE INVENTION

Apparatus and systems have heretofore been provided for measuring the basis weight of sheet material. However, such systems and apparatus have had a number of disadvantages. For example the measurements have been of the analog type and for that reason have lacked the desired accuracy. Other causes of error have been decay of the radiation source utilized, buildup of dirt and dust on the window of the source and changes in density of the surrounding air due to temperature changes. Some of these factors have been recognized in the past, but even if they have been recognized, the remedies have been affected very slowly and only attempted to approximate the error. There is therefore a need for a new and improved basis weight gauging apparatus, system, and method.

SUMMARY OF THE INVENTION AND OBJECTS

The basis weight gauging apparatus comprises a radiation source which provides radiation in the form of a succession of events of varying energies directed toward the sheet material to be gauged. The radiation detector is located to receive the radiation after it has come into contact with the material. Digital counting means is coupled to the radiation detector for counting the events which are received by the radiation detector. Means is coupled to the digital counting means causing the digital counting means to count the events received during a predetermined interval of time. Means is provided for processing the total events counted by the digital counting means to provide a weight per unit area measurement of the sheet material being gauged. Such basis weight measurements may be made continuously as the sheet material is advanced. When this is the case, standardization means is provided to insure that basis weight measurements being made are always correct.

The method comprises the stops which are required for obtaining a digital measurement of the basis weight and method for standardizing the basis weight measurement so that the basis weight measurements are always correct.

In general, it is an object of the present invention to provide an improved basis weight gauging apparatus, system and method.

Another object of the invention is to provide an apparatus, system and method of the above character in which the basis weight measurement is obtained in a digital manner.

Another object of the invention is to provide an apparatus, system and method of the above character which is very accurate and which provides real time information.

Another object of the invention is to provide an apparatus, system and method of the above character in which the sheet material is scanned substantially continuously and in which the basis weight measurements are standardized at periodic intervals.

Another object of the invention is to provide an apparatus, system and method of the above character in which compensations are made for changes in ambient conditions.

Additional objects and features of the invention will appear from the following description in which the preferred embodiment is set forth in detail in conjunction with the accompanying drawings.

BRIEF DESCRIPTION OF THE DRAWING

FIG. 6A is a curve showing the detected radiation intensity with respect to basis weight whereas FIG. 6B shows the number of counts in a fixed time with respect to basis weight and FIG. 6C shows an alternative to FIG. 6B in which a fixed number of counts is a parameter.

DESCRIPTION OF THE PREFERRED EMBODIMENT

Figure 1:
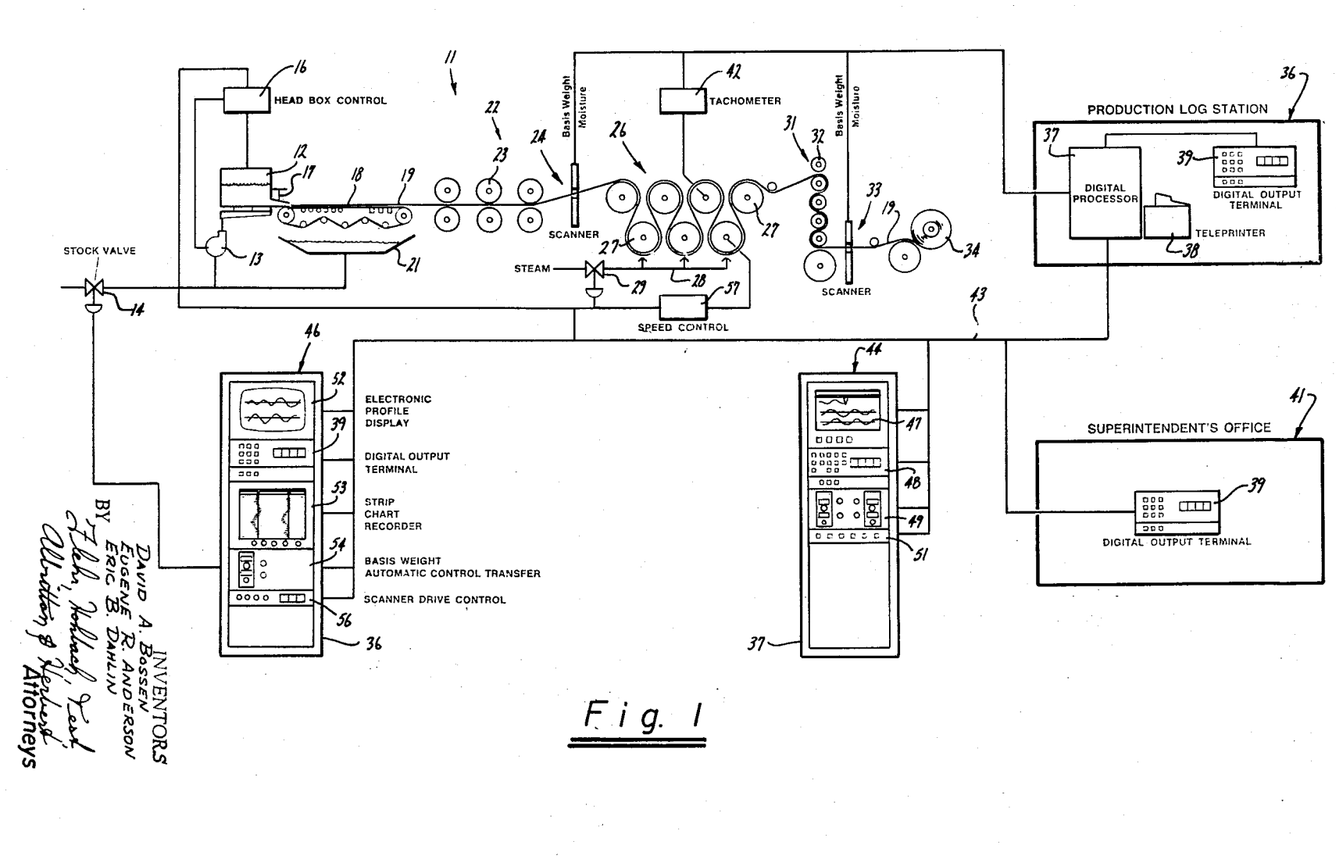
FIG. 1 is a schematic diagram of a basis weight gauging apparatus and system incorporating the present invention and showing the same being utilized for producing sheet material having a predetermined basis weight.

The basis weight gauging apparatus and system as shown in FIG. 1 is shown being used with a conventional paper making machine 11. As is well known to those skilled in the art, such a paper making machine includes a head box 12 which is supplied stock by pump 13 which is connected to a source of supply (not shown) through a stock valve 14. The head box is controlled by head box control 16 and delivers its output through slice 17 onto an endless wire screen belt 18 in the form of a layer which forms a continuous sheet of paper 19. Material which drains from the endless belt 18 is collected by a receptacle 21 and is returned to the headbox 12 by the pump 13.

After leaving the endless belt 18, the sheet of paper 19 passes through a press which consists of a plurality of rolls 23 which remove a substantial portion of the excess moisture in the sheet of paper 19. Thereafter, the sheet of paper travels through a scanner 24 which also may be called a basis weight gauging apparatus which measures the basis weight and moisture of the sheet of paper. Thereafter, the sheet travels through dryers 26 which consist of a plurality of drying cans 27 which are supplied with steam from piping 28 controlled by valve 29. The paper sheet then travels into a calendar stack 31 where the paper is smoothed by a plurality of vertically disposed rollers 32. The sheet of paper then travels through another scanner 33 after which it is wrapped in a large reel 34 which thereafter can be slit and cut into the desired lengths and then shipped to the user.

The paper machine 11 forms a part of a complete system which is utilized for producing paper. The controlling portion of the system includes a production log station 36 which can be located in the paper mill in which the paper machine is operating. The production log station includes a digital processor 37 which has connected thereto a teleprinter 38 which has input and output capabilities. A digital output terminal 39 is connected to the digital processor 37 and can give real time information in digital format on the measurements being accomplished. If desired as shown in FIG. 1, the superintendent's office 41 can also be provided with a digital output terminal so that the superintendent can also monitor every paper making machine.

As also can be seen from FIG. 1, the digital processor 37 is supplied with information from the scanners 24 and 33. In addition, it is supplied with information from the tachometer 42 which measures the speed of rotation of one of the rollers 27. The output line 43 from the digital processor 37 supplies information to consoles 44 and 46 which may contain various recording devices as well as other apparatus. Thus as shown in FIG. 1 there can be provided in the console 44 a cross-machine profile recorder 47, a digital input-output terminal 48, a moisture/speed automatic control transfer unit 49 and a drier-limited control option panel 51.

In console 46 there can be provided an electronic profile display 52, a digital output terminal 39, a strip chart recorder 53, a basis weight automatic control transfer unit 54 and a scanner drive control 56.

The output line 43 from the digital processor is also connected to a speed control unit 57 which is utilized for controlling the speed of the rollers 27. It is also connected to the steam valve 29 and to the headbox control 16. As shown in FIG. 1, the basis weight automatic control transfer 54 is connected to the stock valve 14 to control the same.

The recorder 47 records the moisture content and basis weight across the machine. The electronic profile display shows the cross direction weight of the sheet material as it is being measured. The recorder 53 makes a permanent record of the basis weight and moisture measurements. The unit 54 makes it possible to regulate the basis weight and the scanner drive control unit 56 controls the scanners 24 and 31.

Figures 2, 3:
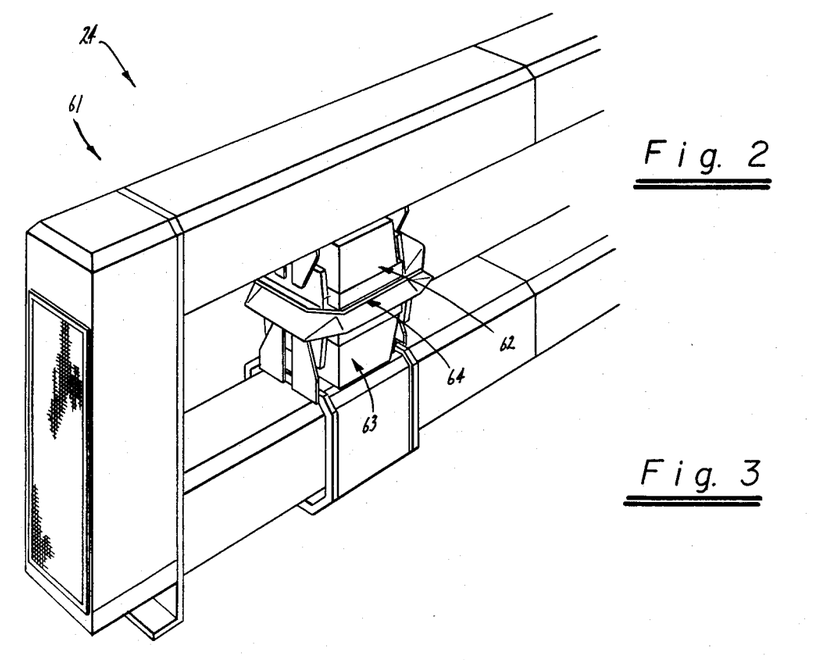
FIG. 2 is a partial perspective view of a portion of a basis weight gauging apparatus which can be utilized in the apparatus and system as shown in FIG. 1.
FIG. 3 is a top plan view of one of the gauging heads utilized in the apparatus as shown in FIG. 2.

In FIG. 2 there is shown a portion of the scanner 24. This scanner is the type described in co-pending application, Ser. No. 793,007, filed Jan. 17, 1969, entitled "Sheet Gauging Apparatus" and consists generally of a framework 61 which includes a pair of spaced upper and lower parallel beams (not shown) which extend laterally of the sheet of paper 19 which is being produced by the paper making machine 11 and which travels through the scanner in the direction shown. Upper and lower gauging heads 62 and 63 are provided in the framework 61 and are adapted to travel longitudinally of the framework and transversely of the sheet of paper 19 which travels through a gap 64 provided between the gauging heads 62 and 63. The drive for the gauging heads 62 and 63 is such that the gauging heads can be moved off sheet or in other words off to the side of the sheet during each direction of travel of the gauging heads 62 and 63.

Figure 4:
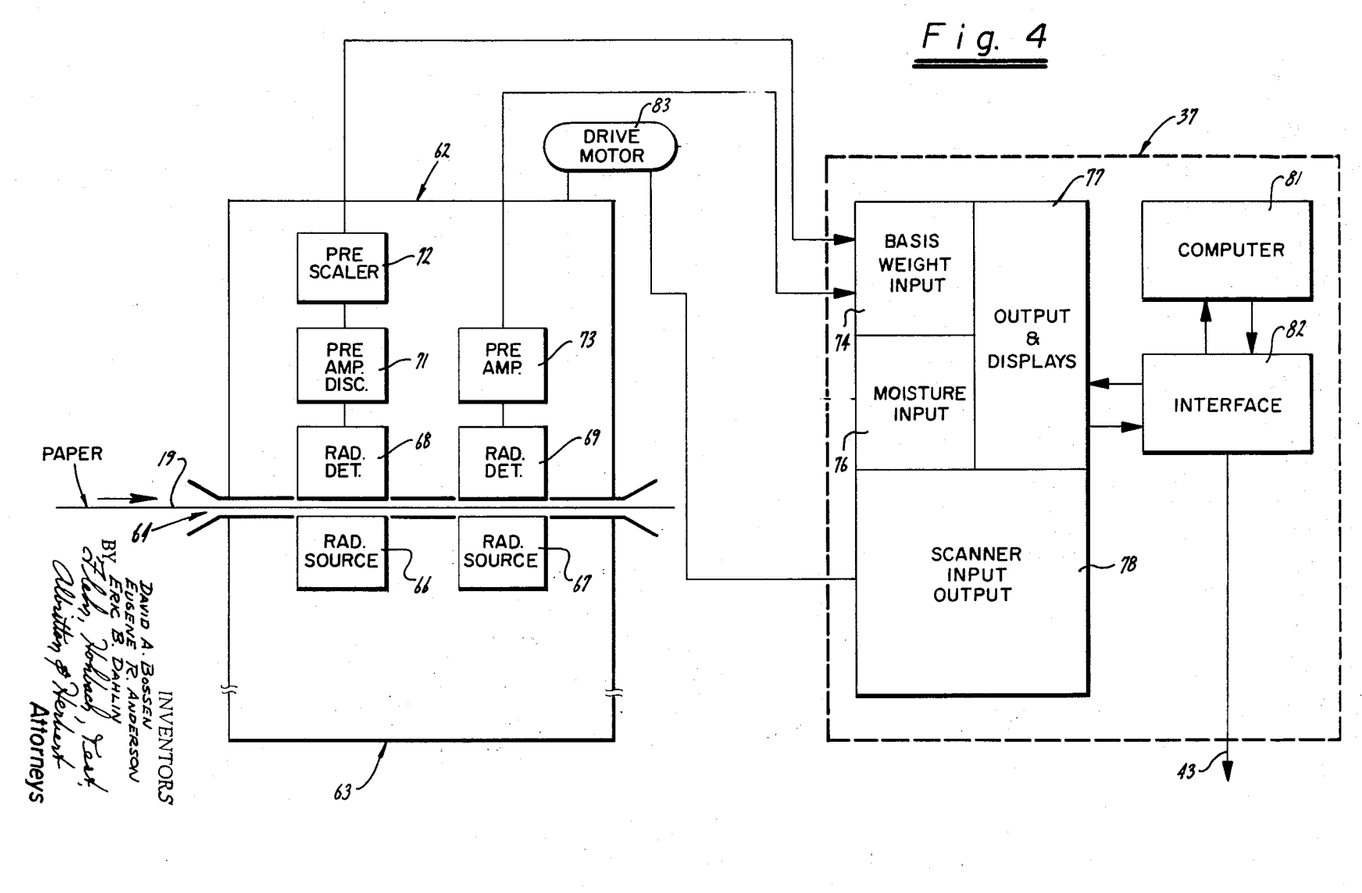
FIG. 4 is a block diagram of certain of the electrical equipment and electronics used in the apparatus and system as shown in FIG. 1.

As shown in the block diagram in FIG. 4, the gauging head 63 includes a pair of radiation sources 66 and 67. Both of the radiation sources 66 and 67 can be of a conventional type. Preferably the radiation source 66 should emit beta radiation so that it can be utilized for making the basis weight measurment whereas the source 67 can emit infrared for the purpose of making moisture measurements. The beta radiation from source 66 is in the form of particles generated by a succession of events due to radioactive decay. In some applications alpha and X-ray radiation are also feasible. If desired, the radiation source can be of the type described in co-pending application Ser. No. 791,915, filed Jan. 17, 1969, titled "Detector Assembly" and now abandoned.

The gauging head 62 carries radiation detectors 68 and 69 in which the radiation detector 68 is capable of sensing radiation from the source 66 and radiation detector 69 is capable of sensing radiation from the source 67. Here again both can be of a conventional type, however, it is preferred that the radiation detector 68 be of the type described in the co-pending "Detector Assembly" application.

From FIG. 4 it can be seen that the sheet of paper 19 travels in the air gap 64 between the heads 62 and 63 in such a manner that radiation from the sources 66 and 67 are directed towards the sheet of paper and are located on one side of the sheet of paper whereas the radiation detectors 68 and 69 are located on the opposite side of the sheet of paper in a position so that they can receive radiation after it has come into contact with the sheet of paper. It should be appreciated that even though in the embodiment shown in FIG. 4, the radiation must travel through the sheet of paper before it can be detected by the detectors 68 and 69, it is possible that both the sources and the detectors be positioned on the same side of the sheet of paper and that the detectors detect the radiation which has been reflected by the sheet of paper rather than that which has traveled through the sheet of paper.

As also shown in FIG. 4 there is provided in the gauging head 62 a preamplifier discriminator 71 which is connected to the output of the radiation detector 68. The output of the preamplifier discriminator 71 is connected to prescaler 72 and the output of this is connected to the digital processor 37 and more specifically to the basis weight input section 74 of the digital processor. Similarly, the output of the radiation detector 69 is to a preamplifier discriminator 73 and the output of this preamplifier discriminator is connected directly into the digital processor 37 and more specifically to the moisture input section 76 of the digital processor.

The digital processor also includes an output and display section 77 and a scanner input-output section 78. A computer 81 is connected by the interface unit 82 to the output and display section 77. Here the interface is provided with an output which is connected to the line 43 for controlling various functions as hereinbefore described. The scanner 78 drives a drive motor 83 which is utilized for positioning the gauging heads 62 and 63 as described in the co-pending application, Ser. No. 792,007, filed Jan. 17, 1969, entitled "Sheet Gauging Apparatus".

Figure 5:
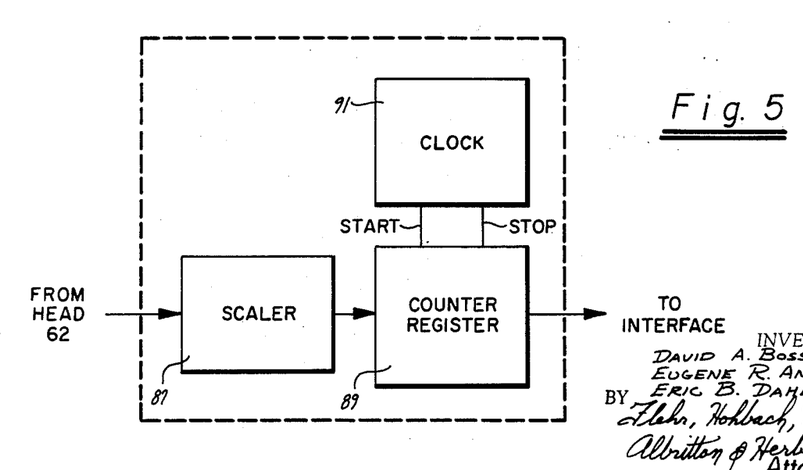
FIG. 5 is a block diagram showing in greater detail the means for scaling the output of the radiation detector.

The preamplifier discriminator 71 connected to the radiation detector 68 preferably consists of a wide band amplifier which has its output connected to a threshold detector that elminates ambient and photomultiplier noise. The prescaler 72 produces an output pulse every time a predetermined number of input pulses have been received. This is desirable because this reduces the frequency capability requirements for the cable leading from the gauging head 62 and which is supplied to the basis weight input section 74 of the digital processor 37. As shown in FIG. 5, the basis weight input section consists of a scaler 37 and which scales the input pulses received from the prescaler 72 and produces an output pulse for every predetermined number of input pulses received. The output pulses are supplied to a counter register 89. The counter register 89 is controlled by a clock 91 which is in turn controlled by the computer 81. The counter register 89 begins to count upon the receipt of a start pulse all of the output events of the scaler 87 and stops counting at the receipt of a stop pulse. The count which is registered in the counter register 89 is then supplied to the interface unit 82 which in turn supplies it to the digital output terminals 39 and to other parts of the apparatus hereinbefore described.

Operation of the apparatus and system in performing the method may now be briefly described as follows. Let it be assumed that the paper making machine 9 is making a continuous sheet of paper 12 which is travelling through the scanners 24 and 33 and that is desired to make basis weight measurements of the paper. As a sheet 19 is traveling through the scanners 24 and 33, the gauging heads 62 and 63 will be traversing back and forth across the sheet of paper as it travels through the scanners. Between the time that the gauging heads are traveling back and forth across or laterally of the sheet of paper, basis weight measurements can be made continuously so as to provide a continuous output in digital form of the basis weight measurement.

During the time that the basis weight measurements are being made, radiation is being continuously emitted by the source 66 in the form of a succession of events of varying energies. As is well known to those skilled in the art, with the radiation source procuing beta or gamma rays and directed at the material, the amount of radiation absorbed by the material gives a direct indication of the basis weight of the material. This is in substantial accordance with Beer's law which is expressed as follows:

$$I = I_o e^{-\mu x} \quad (1)$$

where $e$ is the natural log base, $\mu$ is the mass absorption coefficient which is a function of the radiation energy from the source and of the type of material being measured, $X$ is the weight per unit area of the material being measured in the terms of milligrams per square centimeter, $I_o$ is the intensity of radiation reaching the radiation detector which detects radiation from the radiation source in the absence of absorbing material, and $I$ is the intensity of radiation reaching the detector in the presence of the radiation absorbing material.

A modified Beer's law is being utilized in the present apparatus and system for determining basis weight of the sheet of material. It also can be utilized for determining the specific gravity or density of a liquid or solid material.

Figures 6A, 6B, 6C:
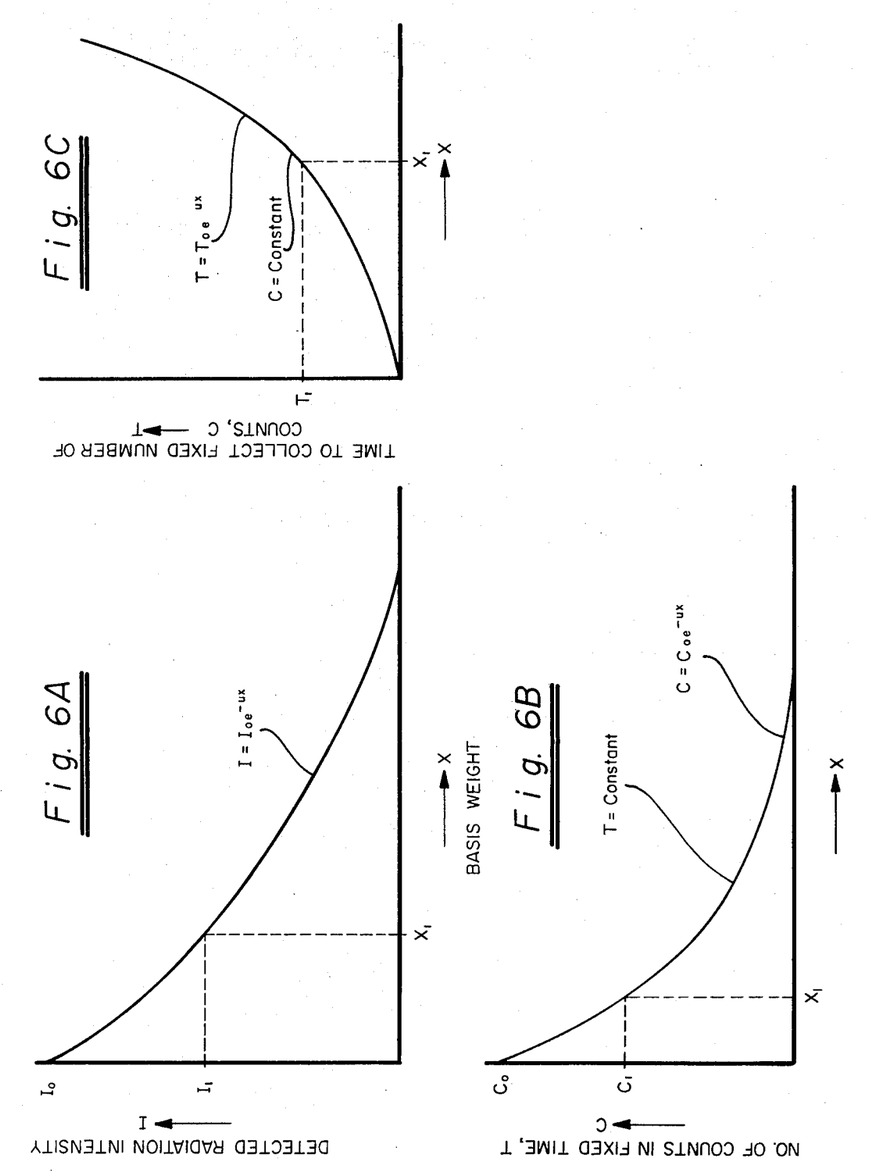

FIG. 6A illustrates the theoretical use of Beer's law when ascertaining the basis weight of a sheet material. As can be seen from FIG. 6A, Beer's law can be expressed as a curve in which the intensity of the detected radiation varies exponentially with the basis weight X. Thus for a predetermined intensity of radiation identified as $I_1$, the basis weight will be $X_1$. However, it has been found that Beer's law may only be used with appropriate correction techniques for high accuracy measurements. For example, as will be discussed in detail below, the exponential characteristic is used only over a small range of basis weight: special compensations are introduced for dirt buildup on the window which covers the radiation detector and for a decaying source.

Conventional analog systems measure Intensity $I_1$ by means of ionization chamber detectors or by current integrating pulse height sensitive detectors. Intensity is defined as the product of the number of events detected, C, and their energy, E; or Intensity is equal to $\Sigma(C \cdot E)$ The higher energy particles have lower absorption coefficients and thus carry less information on the basis weight of light paper or sheet material; yet they are given a higher weighting (in proportion to their energies) in conventional systems and consequently reduce the accuracy that can be obtained. It is therefore believed that the present method which utilizes digital techniques gives a much truer indication of the basis weight of the sheet material being measured. Thus each of the radiation events are counted utilizing the digital techniques and each radiation event is given an equal weight. With an intensity technique, the radiation event having the greater energy would be accorded a greater value when it in fact contains no more information and possibly less information than a radiation event of a lower energy level. That the counting of the radiation events in accordance with the present invention will also give a true indication of radiation absorption of sheet material can be seen from FIG. 6B. When such is the case, the following formula is applicable:

$$C = C_o e^{-\mu x} \quad (2)$$

where $C$ is the number of counts of radiation events detected by the radiation detector in a fixed time, $T$ which is the time between the start and stop pulses from the clock 91 (FIG. 9).

Alternatively if desired, instead of the time base digital system which is shown in FIG. 6B, a count base digital system such as shown in FIG. 6C can be utilized. In the latter case, a predetermined number of counts are utilized and then the time which is required to obtain this number of counts is measured for determining the basis weight of the material being gauged.

In summary in using the digital method of the present invention, the basis weight measurement may be obtained in a digital form either by counting the number of radiation events after they have been affected by the material being gauged in a predetermined interval time or alternatively, a predetermined number of counts can be selected and the time measured to obtain this predetermined number of counts.

The present digital method for measurement of basis weight is more sensitive than an intensity measuring method since substantially every event or particle reaching the radiation detector is sensed. In contrast, in an intensity detector many events have almost no effect. Accuracy of measurement depends upon the information extracted from the radiation; the higher sensitivity of the digital method results in smaller errors which would otherwise occur due to random fluctuations in the energies of the events of the radioactive source.

In operation of the system the digital computer 82 is programmed to coordinate the operation of the system at all times. First it is used when the reference data is entered into the system. It is again used for standardization as hereinafter described. It is also used for making the continuous measurements of basis weight of material as it passes through the scanners.

As pointed out above, any desired degree of accuracy can be obtained. When a time base system is being utilized, the length of the time base is selected to obtain the desired accuracy. Thus where greater accuracies are required, longer time bases are used. Similarly when a count base is utilized, a larger number of counts is used for greater accuracy.

Let it be assumed that the time base digital system is to be utilized and that the apparatus and system is to be operated to overcome the effects of ambient conditions. When such is the case, equation 2 will not be used, but equation 1 can be expanded and generalized as follows. It will be understood that "I" and its specialized forms can represent either "C" in a time base system or "T" in a count base system. With a count base system the equation would be, of course, modified to reflect the positive exponent (see FIG. 6C).

$$I = (I_0^0 + \Delta I_0) e^{-\mu x} e^{-\delta(\mu_a x_a)} e^{-(\mu_a x_a)^0} \tag{3}$$

where $I_0^0$ represents the initial strength of the radiation source, $\Delta I_0$ and $e^{-\delta(\mu_a x_a)}$ are additional error factors related to radiation source decay, dirt build-up on the window of the radiation detector and change in air density due to temperature changes, and $e^{-(\mu_a x_a)^0}$ is a term related to the original error due to dirt build-up on the window and the air density. Equation 3 can be simplified into equation 4:

$$I = I_0 e^{-\mu x} e^{-\mu_a x_a} \tag{4}$$

where $\mu_a x_a$ is equal to $(\mu_a x_a)^0 + \delta(\mu_a x_a)$.

As will be explained in greater detail below when a reference sample of the predetermined material having a known basis weight of $X_1$ is provided and its absorption measured it will produce an intensity or count output of $I_1$ in accordance with the equation:

$$I_1 = I_0 e^{-\mu x_1} e^{-\mu_a x_a} \tag{5}$$

where $I_0$ is the present strength of the radiation source, and $e^{-\mu_a x_a}$ represents the current errors due to the above mentioned factors. Dividing equation 4 by equation 5 yields $$\log_e (I/I_1) = -\mu(X - X_1) \tag{6}$$

which can be rearranged to solve for the unknown basis weight, X, $$X = X_1 - (1/\mu) \log_e (I/I_1) \tag{7}$$

From a computer processing standpoint the logarithmic ratio can be expressed as a series expansion of this function as illustrated in the following equation:

$$X = X_1 - 1/\mu[(I-I_1/I_1) - \tfrac{1}{2}(I-I_1/I_1)^2 + \tfrac{1}{3}(I-I_1/I_1)^3 \ldots (1/n) I-I_1/I_1)^n] \tag{8}$$

where $X_1$ is known since it has actually been weighed, $I$ is the actual count on the radiation detector, and $\mu$ and $I_1$ can easily be determined as will be immediately discussed below. Only the first three terms of the equation are normally significant.

OBTAINING $I_1$ AND STANDARDIZING

When a new grade of material is to be measured by the scanner, a sample of known size is cut and weighed to provide the basis weight value $X_1$. This sample is placed in the air gap 64 by suitable means such as a jig (not shown). The number of counts $I_0^0$ received during a predetermined period of time indicates the relative basis weight of the sample in accordance with the following equation:

$$I_1^0 = I_0^0 e^{-\mu x_1} e^{-(\mu_a x_a)^0} \tag{9}$$

After this measurement is made the sample material with a basis weight of $X_1$ is removed from the air gap 64 and another measurement made to determine the events which can be counted in a predetermined period of time with only air in the gap 64 in accordance with the following equation:

$$I_a^0 = I_0^0 e^{-(\mu_a x_a)^0} \tag{10}$$

Equation 10 can be updated by making an air gap measurement after every scan of gauging heads 62 and 63 in order to update error factors such as source decay, window dirt build-up, and change of air density in accordance with the formula:

$$I_a = I_0 e^{-\mu_a x_a} \tag{11}$$

Substituting equation 11 into equation 3 yields:

$$I_1 = I_a e^{-\mu x_1} \tag{12}$$

Dividing equation 9 by equation 10 yields:

$$I_1^0/I_a^0 = e^{-\mu x_1} \tag{13}$$

Substituting equation 13 in equation 12 provides the final value for $I_1$, $$I_1 = I_a (I_1^0/I_a^0) \tag{14}$$

Thus $I_1$ is related to the updated air gap measurement taken periodically after every scan of the gauging heads as corrected by the initial air gap and initial basis weight measurements $I_a{}^o$ and $I_1{}^o$. The above process is known as standardizing and is applicable both to a digital count system as in the present invention and systems where detected radiation is measured by intensity or analog techniques where I represents the current produced by an ionization chamber reflecting received radiation intensity. In the latter case, radiation detector 68 would be in the form of an ionization chamber.

OBTAINING $\mu$ (MASS ABSORPTION COEFFICIENT)

Rearranging equation 13, the value of $\mu$ is $$\mu = -(1/X_1) \log_e(I_1{}^o/I_a{}^o)$$

(15)

For ease of processing this logarithmic ratio can be broken down into a similar type of series expansion as in equation 8 for handling by computer. From a practical aspect only the first six terms of the expansion need be used for desired accuracy.

DETAILED PROCEDURE

In actual practice the information for initial reference values $I_a{}^o$ and $I_1{}^o$ are obtained by use of the digital input-output terminal 48 (FIG. 1). The appropriate button is pressed on the terminal and the digital processor 37 opens the radiation source and allows the radiation detector to detect the events through the air gap without the sheet of paper therein. Next, the operator places a sample $X_1$ in a jig and places it in the air gap and pressing another button on the terminal 39 causes a second measurement to be made to yield $I_1{}^o$. Since the sample may not be homogeneous it is necessary that the sample be continuously moved to present different portions to the radiation source. This may be done manually or automatically. As a check the operator can replace the sample in the jig, press a button called "Basis Weight Sample Button" and cause the basis weight gauge detector to actually recheck the basis weight of the sample. This, of course, should check with the originally physically checked weight. At this time the basis weight gauge of the present invention is activated to perform its basis weight measurement procedure and the actual basis weight will be indicated in digital form in the output terminals 39 on the strip chart recorder 53 and the electronic profile display 52. The automatic control transfer unit 54 will serve to control the stock valve 14 to maintain the system producing this basis weight.

The scanners 24 and 33 in conjunction with a conventional paper making machine will scan the width of paper 19 once every thirty seconds and at that time go off the paper so that the air gap 64 is clear of the sheet 19 and at this time the digital processor will cause the measurement of $I_a$ to be made. Thus, errors caused by changes of air density, dirt build-up, and source decay will be compensated for. In other words, a new value of $I_1$ will be provided to be used during the next scan across the sheet material to determine the actual basis weight in accordance with equation 8.

If the calibration standard for a particular grade of paper is desired to be changed due to a change of pulp conditions, the calibration is easily made by cutting out a sample of this grade under the current pulp conditions and going through the procedure of establishing a new standard for the grade with this particular ash content. This requires only a few minutes of operator time.

Thus the present invention provides an inherently highly accurate system of measuring basis weight of sheet material and other types of material which because of the digital nature of counting the radiation events is inherently highly accurate. In addition, rapid and substantially continuous updating is provided by the standardization program.

It is apparent from the foregoing that there has been provided a basis weight gauging apparatus, system and method which utilizes digital techniques and therefore obtains a highly accurate measurement of the material being gauged. Even though the basis weight measurements are being made substantially continuously, the basis weight measurements are standardized substantially continuously so that ambient conditions do not affect the accuracy of the basis weight measurement being made. In addition, the apparatus and system is such that it is substantially automatic and makes it possible for relatively unskilled personnel to operate the paper making machine to cause it to produce paper having a predetermined basis weight. The present invention also provides information as to thickness where the density of a material is constant. This would be especially true with materials such as steel and plastic films.

We claim:

1. A basis weight gauging method for measuring the weight per unit area of a material having scanning head means for carrying a radiation source and a radiation detector and providing a gap therebetween for said material, the radiation source providing radiation in the form of a succession of events having a plurality of different energy levels, where the detector receives said radiation having said plurality of different energy levels after it has come into contact with said material and counts the radiation events received to provide a digital count, I, proportional to the number of said events indicative of radiation absorbed by said material, and where a reference sample of said material is used having a known basis weight, $X_1$, said method comprising the steps of a. placing said reference sample in said gap and obtaining an initial digital count measurement, $I_1{}^o$,
b. removing all material from said gap leaving only air and obtaining an initial measurement, $I_a{}^o$,
c. obtaining the mass absorption coefficient, $\mu$, of said radiation source and material by $$\mu = (-1/X_1) \log_e (I_o/I_{oa}{}^o)$$

d. scanning said predetermined material to obtain a measurement, I, and periodically during said scanning removing all material from said gap to obtain $I_a$, which is an updated $I_a{}^o$ which takes changing ambient conditions into account including the effect of decay of said source, air density change due to temperature variation and dirt build-up on the window of the radiation source, and in addition from $I_a$ obtaining an updated $I_1{}^o$, namley $I_1$, by $$I_1 = I_a (I_1{}^o/I_a{}^o)$$

and e. obtaining the actual basis weight, X, of said material by $$X = X_1 - (1/\mu) \log_e(I/I_1).$$

* * * * *

PO-1050
(5/69)

UNITED STATES PATENT OFFICE
CERTIFICATE OF CORRECTION

Patent No. 3,757,122     Dated September 4, 1973

Inventor(s) Bossen et al

It is certified that error appears in the above-identified patent and that said Letters Patent are hereby corrected as shown below:

Column 10, line 51, $$\mu = (-1/X_1) \log_e I_1^{\,0}/I_a^{\,0}$$

Signed and sealed this 4th day of February 1975.

(SEAL)
Attest:

McCOY M. GIBSON JR.
Attesting Officer

C. MARSHALL DANN
Commissioner of Patents